United States Patent [19]
Schmed

[11] Patent Number: 6,129,006
[45] Date of Patent: Oct. 10, 2000

[54] COFFEE MACHINE

[75] Inventor: Arthur Schmed, Oberdürnten, Switzerland

[73] Assignee: Finanara International B.V., Amsterdam, Netherlands

[21] Appl. No.: 09/235,716

[22] Filed: Jan. 22, 1999

[30] Foreign Application Priority Data

Jan. 26, 1998 [CH] Switzerland ............................ 0169/98

[51] Int. Cl.[7] ................................................. A47J 31/34
[52] U.S. Cl. ......................... 99/302 P; 99/289 R; 99/287
[58] Field of Search ............................. 99/302 P, 289 R, 99/287, 302 R, 297

[56] References Cited

U.S. PATENT DOCUMENTS

| | | | |
|---|---|---|---|
| 3,760,712 | 9/1973 | Rossi ........................................ | 99/289 R |
| 4,852,472 | 8/1989 | In-Albon et al. .................. | 99/302 P X |
| 5,275,089 | 1/1994 | Armellin ............................ | 99/302 P X |
| 5,479,848 | 1/1996 | Versini ............................... | 99/302 P X |
| 5,657,683 | 8/1997 | Sandei et al. ...................... | 99/302 P X |
| 5,755,149 | 5/1998 | Blanc et al. ....................... | 99/302 P X |

*Primary Examiner*—Reginald L. Alexander
*Attorney, Agent, or Firm*—Tarolli, Sundheim, Covell, Tummino & Szabo L.L.P.

[57] ABSTRACT

A coffee machine is provided with a boiler for heating brewing water, a brewing cylinder defining a brewing chamber, a closure piston for closing the one open end of the brewing cylinder as well as a brewing piston for compressing the coffee powder in the brewing cylinder and/or for ejecting the elutriated coffee powder cake, whereby the brewing piston is longitudinally movable in the brewing cylinder. The closure piston is integrally formed or rigidly connected to the housing of the boiler and firmly mounted to the housing of the coffee machine. Moreover, there is provided a brewing module that is removably inserted into the housing of the coffee machine and that includes at least the brewing cylinder and the brewing piston. The brewing cylinder and the brewing piston are movable in longitudinal direction, but cannot be rotated. Such a coffee machine can be designed very compactly. Moreover, the brewing module consists of only a few elements and, thus, can be manufactured at low costs and is very reliable in operation.

6 Claims, 6 Drawing Sheets

COFFEE MACHINE

BACKGROUND OF THE INVENTION

The present invention refers to a coffee machine comprising a boiler for heating the brewing water, an essentially hollow brewing cylinder having a central longitudinal axis and an open end, and a driving unit for moving the brewing cylinder along said central longitudinal axis.

A closure piston is adapted to close the open end of the brewing cylinder to thereby form a brewing chamber, and a brewing piston is located in the interior of the brewing cylinder that is movable along said central longitudinal axis to compress coffee powder received in said brewing cylinder means as well as for removing the used coffee powder cake.

In a coffee machine of this kind, principally, a coffee beverage is prepared as follows: A brewing chamber is filled with a predetermined amount of coffee powder. This coffee powder is compressed by a movable piston and, thereafter, hot water is pressed through the compressed coffee powder under high pressure. In order to close the open side of the brewing chamber, there is provided a usually stationary closure piston, whereby the brewing cylinder usually is movable with regard to the closure piston. The brewing piston adapted to compress the coffee powder is received in the interior of the brewing cylinder and is also used, besides its task to compress the coffee powder, to remove the used coffee powder cake from the brewing cylinder. For heating the brewing water, a boiler is used, from which the hot brewing water flows through a pipe to one of the two afore mentioned pistons. The relevant piston is provided with a sieve plate member. The hot brewing water is fed to that sieve plate member, thereby evenly distributed, enters the brewing chamber and evenly flows through the compressed coffee powder.

PRIOR ART

The European Patent Nr. 0,538,191 discloses a coffee machine of this kind. It comprises two separate modules. One of these modules incorporates the brewing assembly which is in operational connection with the second module. The second module is arranged on glide rails and essentially comprises a driving motor as well as a gearbox. In the first module, all parts are arranged that are subjected to contamination by coffee powder or coffee beverage, particularly a brewing cylinder, a closure piston, a brewing piston as well as a driving spindle. In the housing of the coffee machine itself, a fresh water tank, a pump and a boiler are located. In order to lead the water heated by the boiler to the brewing assembly, a pipe is provided whose length essentially corresponds to the width of the coffee machine. In order to enable the first module, comprising the brewing assembly, to be removed from the machine, coupling means have to be provided by means of which the above mentioned pipe can be separated. Since the brewing water for brewing the coffee powder received in the brewing chamber usually has a pressure of between 10 and 15 bar, such coupling means have to be designed very rigidly and costly.

It is a disadvantage in those coffee machines that the quality of the prepared coffee beverage is subjected to certain fluctuations. This is particularly evident if two or more coffee beverages are prepared subsequently. In this case, the first coffee beverage is distinctly cooler than the subsequent ones. But also as the taste of the coffee beverage is concerned, differences between the first coffee beverage and the subsequent ones can be noticed. This may be explained as follows: When the first coffee beverage is prepared, the pipe leading from the boiler to the brewing assembly, the coupling means as well as the piston connected to the brewing water pipe are still cold. The result is that the brewing water leaving the boiler with a temperature of between 90° C. and 95° C. clearly cools down before it flows through the coffee powder contained in the brewing chamber. If subsequently a second coffee beverage is prepared, the above named parts are still warm with the result that the brewing water flowing through the coffee powder contained in the brewing chamber has a higher temperature. Additionally, caused by the length of the pipe between boiler and brewing assembly, the temperature of the brewing water is even more lowered.

OBJECTS OF THE INVENTION

Thus, it is an object of the present invention to improve a coffee machine of the kind referred to above in such a way that the quality of the prepared coffee beverage has a constant high quality.

Additionally, it is also an object of the present invention to improve a coffee machine of the kind referred to above in such a way that its constructive design is substantially simplified.

SUMMARY OF THE INVENTION

To meet these and other objects, the present invention provides, according to a first aspect, a coffee machine comprising a boiler for heating water having a housing, an essentially hollow brewing cylinder having a central longitudinal axis and an open end, and a drive assembly for moving the brewing cylinder along said central longitudinal axis.

Further provided is a closure piston adapted to close the open end of the brewing cylinder to thereby form a brewing chamber, and a brewing piston located in the interior of the brewing cylinder. The brewing piston is movable along said central longitudinal axis to compress coffee powder received in the brewing cylinder as well as for removing the used coffee powder cake. Thereby, the closure piston is directly connected to the housing of the boiler for heating water. According to a second aspect, the present invention provides a coffee machine comprising a boiler for heating water having a housing, an essentially hollow brewing cylinder having a central longitudinal axis and an open end, and a drive assembly for moving the brewing cylinder along said central longitudinal axis.

Further provided is a closure piston adapted to close the open end of the brewing cylinder to thereby form a brewing chamber, and a brewing piston located in the interior of the brewing cylinder. The brewing piston is movable along said central longitudinal axis to compress coffee powder received in the brewing cylinder as well as for removing the used coffee powder cake. Thereby, the closure piston is an integral part of the housing of the boiler for heating water.

Due to the fact that the closure piston is an integral part of the housing of the boiler or is directly connected thereto, not only the connection pipe between boiler and brewing chamber and the coupling device can be avoided. But also an important advantage is that the closure piston is always heated by the boiler. All these measures contribute to the fact that the temperature of the brewing water is always constant when it enters the brewing chamber with the result that the coffee powder in the brewing chamber is brewed always with the optimal temperature.

A further advantage of a coffee machine having the mentioned characteristics is that the entire machine can be designed much more compact because a boiler with integral or directly thereon connected closure piston is substantially smaller than a boiler and a separate closure piston. Moreover, the connecting pipe between boiler and closure piston including the associated coupling devices can be cut down, with the result that the coffee machine is of simpler design, more reliable and can be manufactured at lower costs.

In a preferred embodiment of the coffee machine, the boiler for heating water together with the closure piston is rigidly mounted in the interior of the housing of the coffee machine, whereby there is provided a brewing module including at least the brewing cylinder and the brewing piston that is releasably inserted into the housing of the coffee machine. Such a design offers the advantage that the brewing module can be designed very compactly and that a releasable coupling for feeding brewing water can be avoided.

BRIEF DESCRIPTION OF THE DRAWINGS

In the following, an embodiment of the coffee machine according to the invention will be further described, with reference to the accompanying drawings, in which.

DETAILED DESCRIPTION OF PREFERRED EMBODIMENT

Figure 1:
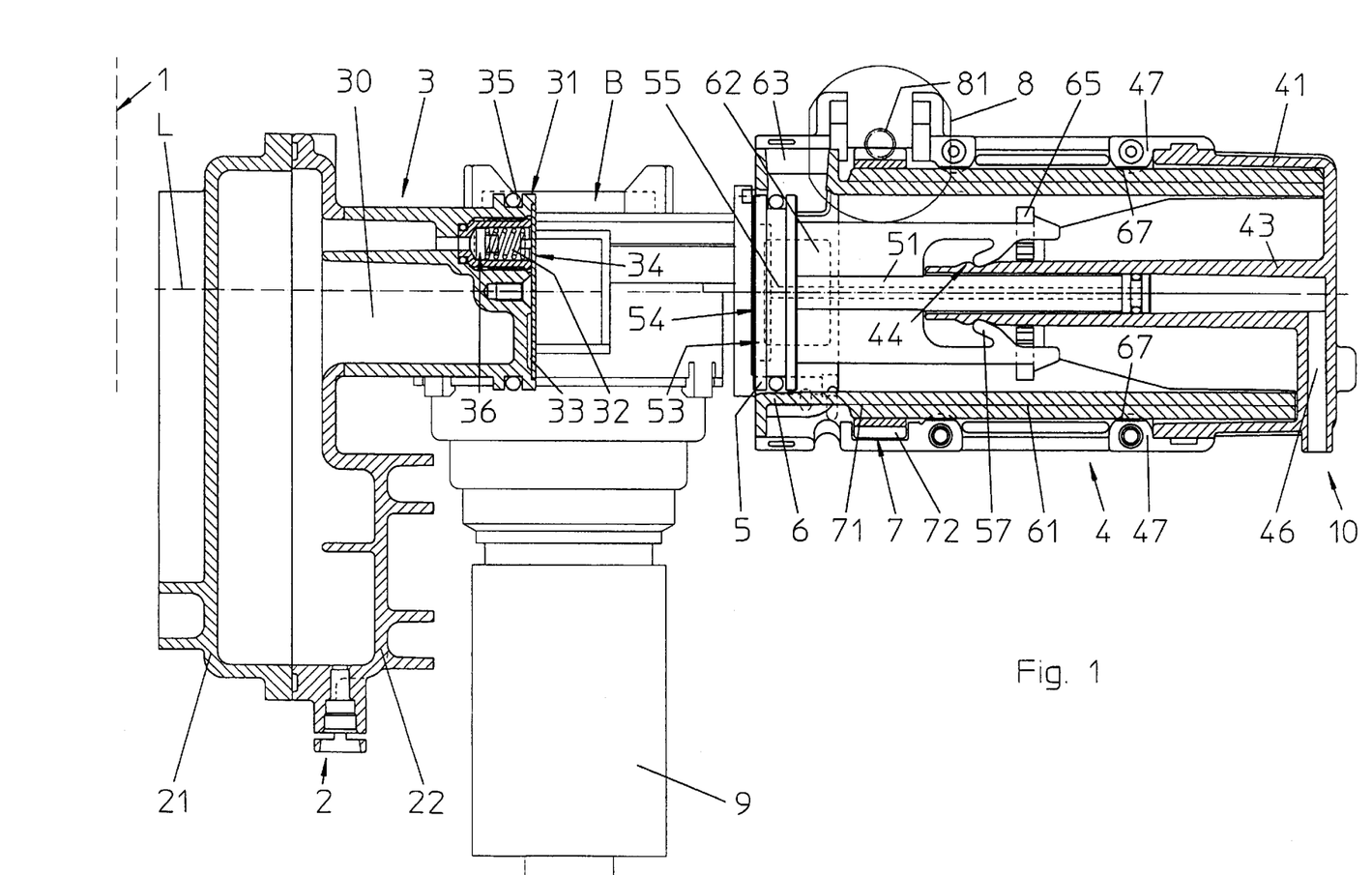
FIG. 1 shows a lateral partial cross sectional view of an embodiment of a boiler and a brewing module according to the invention in the initial position.

With the help of FIG. 1, the general design of the coffee machine is further explained, whereby the illustration of FIG. 1 shows only the parts and elements essential of the coffee machine according to the invention. The illustration of FIG. 1 shows parts of the housing 1 as well of the water heater 2, a brewing module 4, a driving motor 8, a grinding mill 9 and an outlet 10.

The water heater 2 in the form of the boiler consists of two halves 21 and 22 in the form of shells, the shell 22 being directly and integrally formed with the closure piston 3. The closure piston 3 is of essentially hollow shape and communicates with the interior of the water heater 2. Thereby, the closure piston 3 is filed with the heated water and homogeneously heated. The front portion of the closure piston 3 consists of a plastic part 31. This plastic part 31 is provided with a chamber 32 of hollow cylindrical shape enclosing a chamber 32 in which is provided a valve 36. The valve 36 takes two functions: On the one hand, it acts as a pressure relief valve that opens if a certain excess pressure occurs in the boiler 3; on the other hand, it operates as a check valve ensuring that no brewing water can flow back into the boiler 3. The above mentioned plastic part 31 is located on that side of the closure piston which faces the brewing chamber. At its front side, the plastic part 31 comprises a recess 33 that is covered with a sieve plate 34. The recess 33 is in communication with the hollow chamber 32 and with the outlet of the valve 36, respectively. By the provision of the recess 33 and the sieve Plate 33 a uniform distribution of the brewing water regarding the cross section of the brewing chamber and brewing cylinder 6, respectively, is ensured. Moreover, the closure piston 3 is additionally provided with a sealing ring 35.

Besides a housing 41, the brewing module 4 comprises essentially a brewing piston 5, a brewing cylinder 6 as well as an operating member 7. The brewing cylinder 6 has essentially hollow cylindrical shape and is provided at its circumference with an outer thread. The brewing piston 5 is movably received in the brewing cylinder 6. The operating member 7 is axially fixed and concentrically received in the brewing cylinder 6. The operating member 7 that is fixed in axial direction is rotatably and concentrically located as far as the brewing cylinder is concerned and provided with an inner thread 71 that engages the outer thread 61 of the brewing cylinder 6. In order to avoid a rotation of the brewing cylinder 6 around its longitudinal axis, the housing of the brewing module 4 is provided with guiding elements 47 that engage correspondingly shaped recesses 67 located at the outside of the brewing cylinder 6.

At the outside, the operating member 7 is provided with teeth 72 in the shape of a gear wheel. The driving motor 8 is located laterally of the brewing module 6 and is provided with a driving member 81 in the form of a worm that is engagement with the teeth 72 of the driving member 7. If the driving motor 8 is in the operating position shown in the drawing in order move the driving motor 8 from the operating position into the rest position, the motor 8 is pivotally mounted. This is important as the driving motor 8 has to be brought into its rest position before removing the brewing module 4. In that way, the driving member 81 of the driving motor 8 is no longer in engagement with the teeth of the operating member 7. Preferably, means are provided between the brewing unit 4 and the driving motor 8 that swivel the driving motor 8 from the rest position into the operating position upon inserting the brewing module 4 in which the driving member 81 of the driving motor 8 engage the teeth 72 of the operating member 7. Those means are not shown in the drawing for clarity's sake.

The front side of the brewing cylinder 6 is provided with two radial openings 62,63 through which ground coffee can be fed. By the provision of two openings 62 and 63, respectively, it is possible to sequentially feed two different sorts of coffee into the brewing chamber. Through the one opening 63, it is possible to directly feed coffee from the ground mill 9 to the brewing cylinder 6, if the brewing cylinder 6 is in its filling position, as will be further described. The second opening 62 is provided to feed a further brand of coffee to the brewing cylinder, if desired. Since only one ground mill 9 is provided, it is necessary to feed the second opening 62 with already ground coffee. Another possibility is that two ground mills as well as two corresponding openings in the brewing cylinder are provided with the result that different coffee beverage, prepared of freshly ground coffee, can be prepared. Finally, it is possible that the brewing cylinder may be provided with three radially extending openings; two of them are fed each from a separate milling ground, while the third opening, again, communicates with one opening provided in the housing of the coffee machine The housing 41 is provided with a tube-like collar 43 located in the interior of the housing. The collar 43 is provided with a shoulder 44 located at its front end. The rear end of the tube-like collar 43 is provided with a curved portion 46 through which the coffee beverage can flow to the outlet 10.

The brewing piston 5 received in the brewing cylinder 6 is provided with a tube shaped piston rod 51, through which the brewed coffee beverage can leave the brewing chamber. In order to enable the brewed coffee beverage to flow from the front side of the brewing piston 5 to its back side, the brewing piston 5 is provided at its front side with a recess 53 that is covered by a sieve plate member 54. The recess 53 is connected to the tube shaped piston rod 51 by means of a channel 55. Moreover, the brewing piston 5 is provided with snap cams 57 that engage the notch 44 provided in the tube-like collar 43, as seen in the base position of the coffee machine illustrated in FIG. 1. Moreover, the brewing cylinder 6 is provided with catch members 65 located in its interior for positively entraining the brewing piston 5. The operation of the elements mentioned above will be further explained herein below.

As can be seen from FIG. 1, both the brewing module and the closure piston are horizontally arranged in the coffee machine; in other words, their longitudinal axes run in horizontal direction.

It is understood that the brewing module as well as the closure piston also can be arranged horizontally in the coffee machine. In this case, the water heater is located above the brewing cylinder such that the water flows vertically through the brewing chamber. Moreover, also the radial openings in the brewing chamber can be avoided since the feeding of the coffee powder is accomplished by means that are located laterally oblique with regard to the brewing cylinder.

The brewing module 4 is releasably inserted into the coffee machine by means of a not illustrated connection means, for example a bayonet joint.

Figure 5:
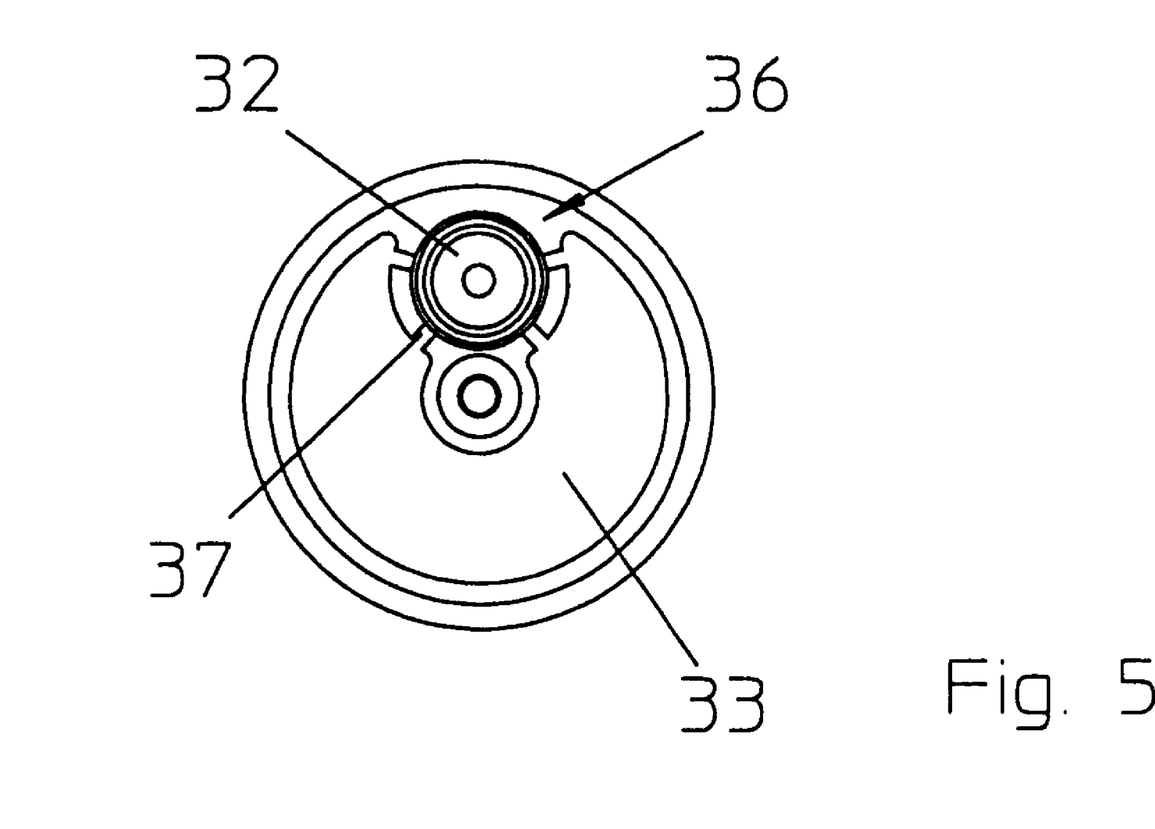
FIG. 5 shows a top view of the boiler.

FIG. 5 shows the closure piston 3 in a top view. In this illustration are shown not only the valve 36 and the recess, but also channels 37 that interconnect the valve 36 and the chamber 37, respectively, with the recess 33.

Figure 6:
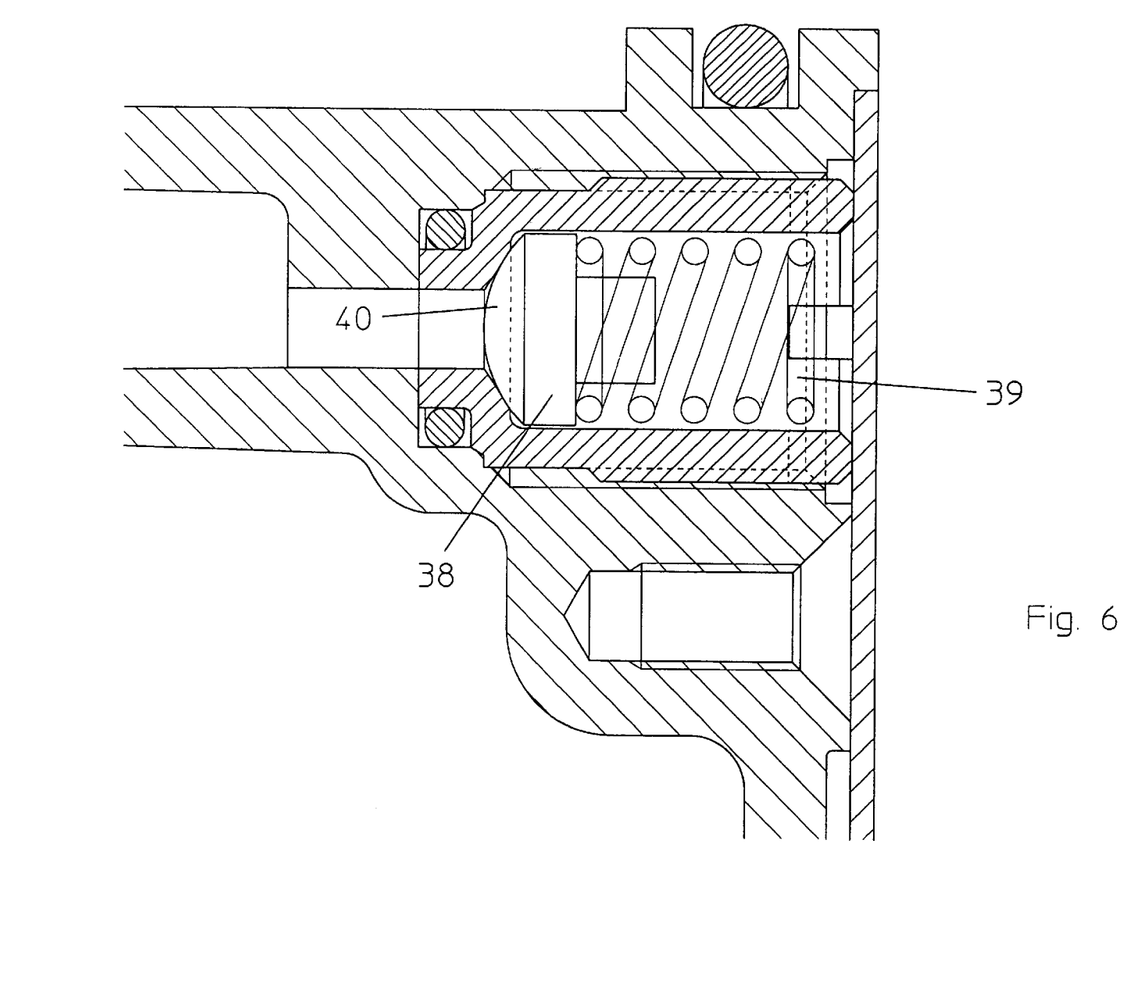
FIG. 6 shows a top view of the closure piston.

FIG. 6 shows a detailed view of the closure piston 33. The valve 36 consists of a valve body 38 that is biased by a spring 39. The sealing surface of the valve body has the shape of a segment of sphere. As soon as a predetermined pressure in the boiler is reached, the valve body 38 is moved against the biasing force of the spring 39. Moreover, the valve body avoids that brewing water flows back from the brewing chamber into the boiler 3.

Figure 2:
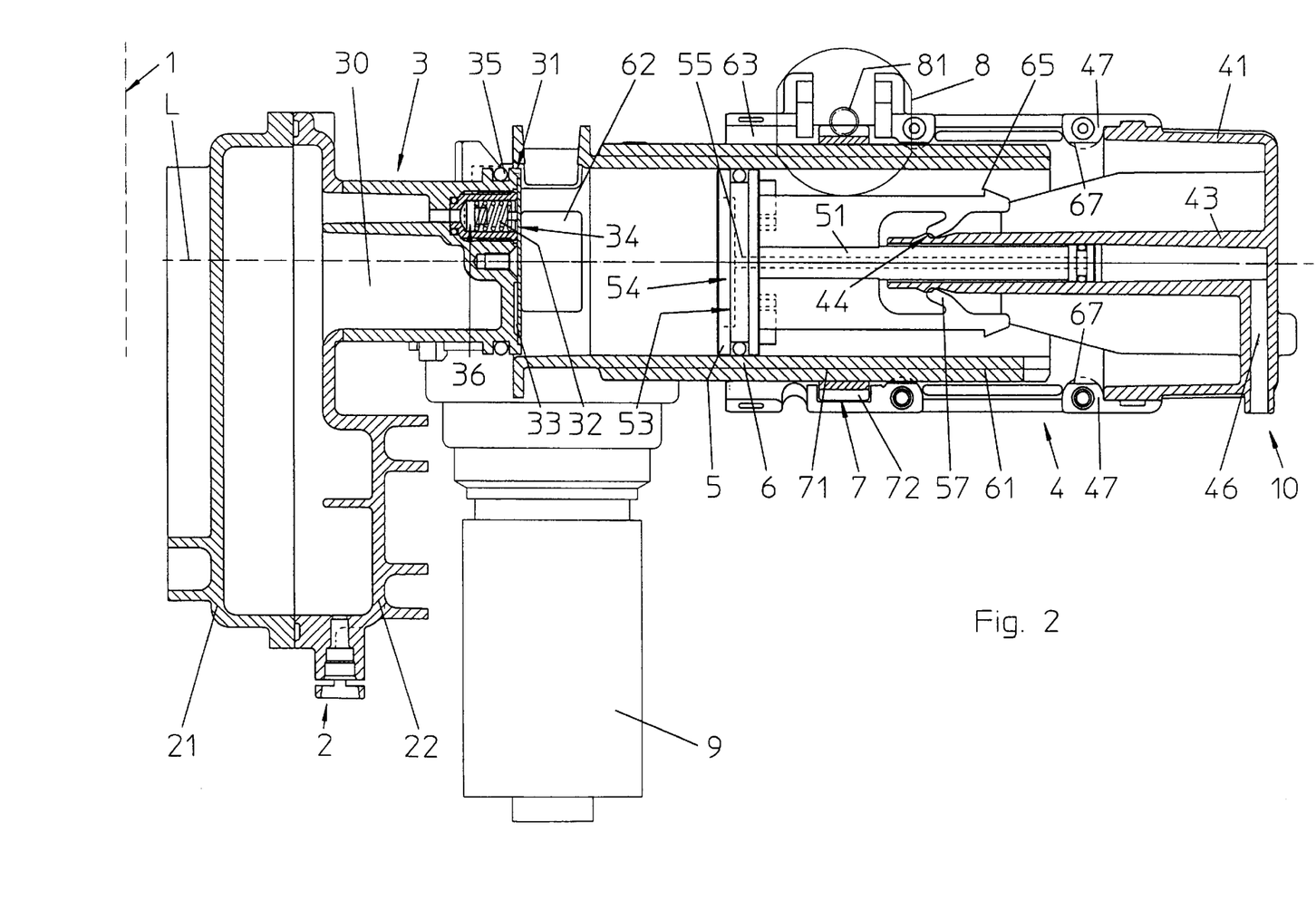
FIG. 2 shows the boiler and a brewing module according to FIG. 1 in the filling position.

The operation of this coffee machine can be explained as follows:

From the base position as illustrated in FIG. 1, the brewing cylinder is moved into the filling position, as illustrated in FIG. 2 in which the closure piston 3 closes the end of the brewing cylinder 6. The movement of the brewing cylinder 6 is accomplished by means of the driving motor 8. Thereby, the operating member 7 is rotated by means of the driving member 81 of the driving motor 8 with the result that the operating member 7 moves the brewing cylinder 6 by means of the inner thread 71 of the operating member 7 engaging the outer thread of the brewing cylinder 6. During that movement of the brewing cylinder 6, the brewing piston 5 remains in its initial position because its snap cams 57 are engaged in the shoulder of the tube-like collar 43. As soon as the front edge of the brewing cylinder 6 has passed the closure piston 3, coffee powder, freshly ground by the grinding mill, is filled into the brewing chamber 6 through the one aperture 62. Thereafter, the brewing cylinder 6 is further moved, whereby the closure piston 5 now is entrained by the brewing cylinder 6 because the catch members 65 now engage the back side of the brewing piston 5. By the brewing piston 5 now moving towards the closure piston 3, the coffee powder contained in the brewing chamber 6 is compressed. By virtue of the forward movement of the brewing cylinder 6, also the sealing ring 35 of the closure piston 3 comes in contact with the inside of the brewing cylinder 6, with the result that now a sealed brewing chamber B is formed by the brewing cylinder 6 and the two pistons 3 and 5. The forward movement of the brewing chamber 6 together with the brewing piston 5 is stopped as soon as the coffee power has reached a predetermined degree of compression, i.e. is compressed with a certain power. The stopping of the forward movement of the brewing cylinder 6 can be accomplished, for example, by monitoring the torque of the driving motor 8. As soon as the forward movement of the brewing cylinder 6 is stopped, the brewing module 4 is in its brewing position. Instead of monitoring the torque of the driving motor, for example, also the speed of revolution thereof could be monitored.

Figure 3:
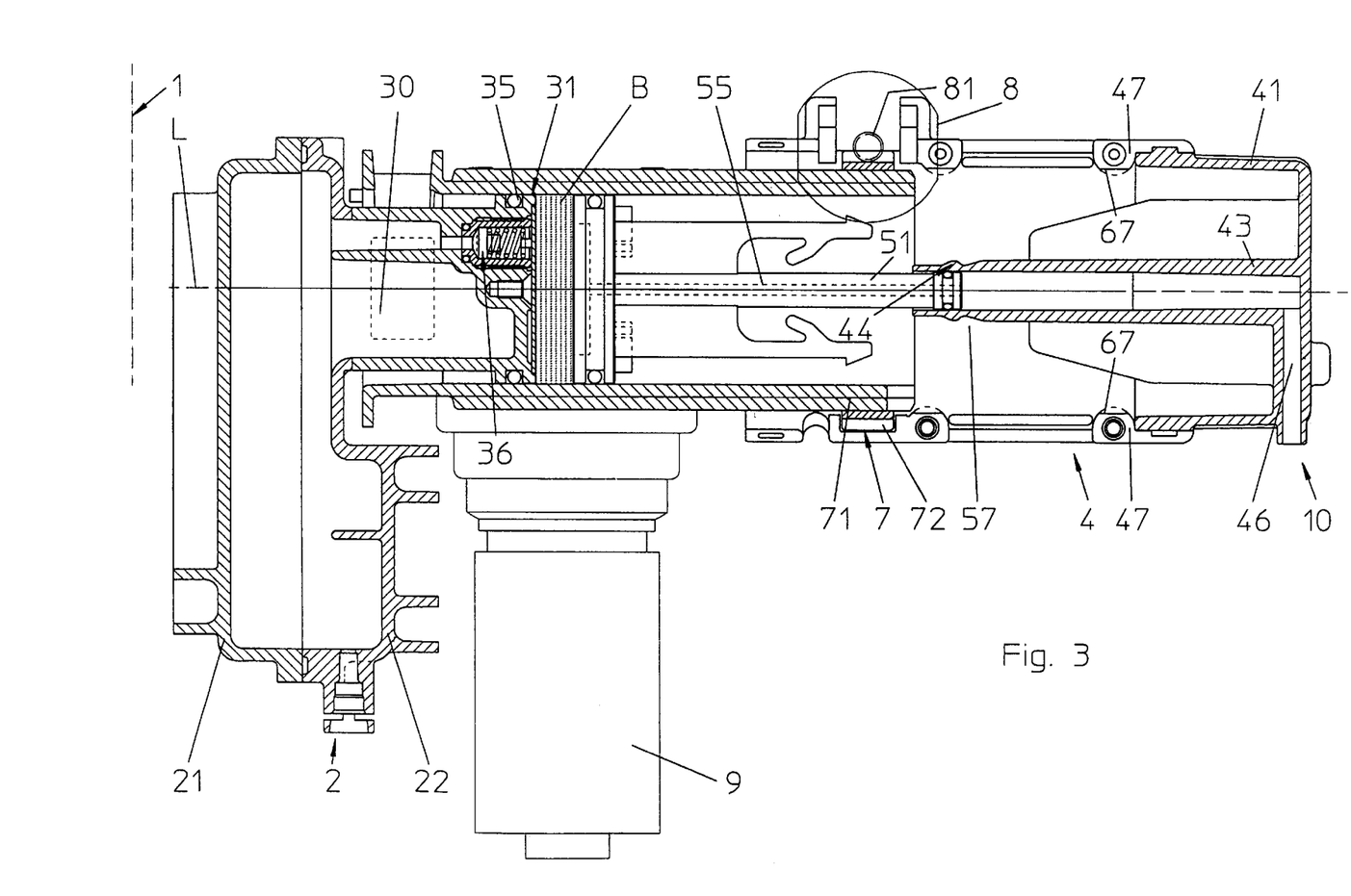
FIG. 3 shows the boiler and a brewing module according to FIG. 1 in the brewing position.

The brewing position is illustrated in FIG. 3. In order to brew the compressed coffee powder. Now the pump, not shown in the drawings, is started. Thereby, an overpressure is created in the boiler 2, and the brewing water can flow from the boiler 2 via the valve 36 to the rear side of the sieve plate member 33 and there-from into the brewing chamber B, where the coffee powder received therein is brewed. At the other end of the brewing chamber B, the now as coffee beverage designated brewing water flows through the sieve plate 54 located in the brewing piston 5 and further flow through the hollow piston rod 51, the tube-like collar 43 and the curved portion 46 into the beverage outlet 10.

Figure 4:
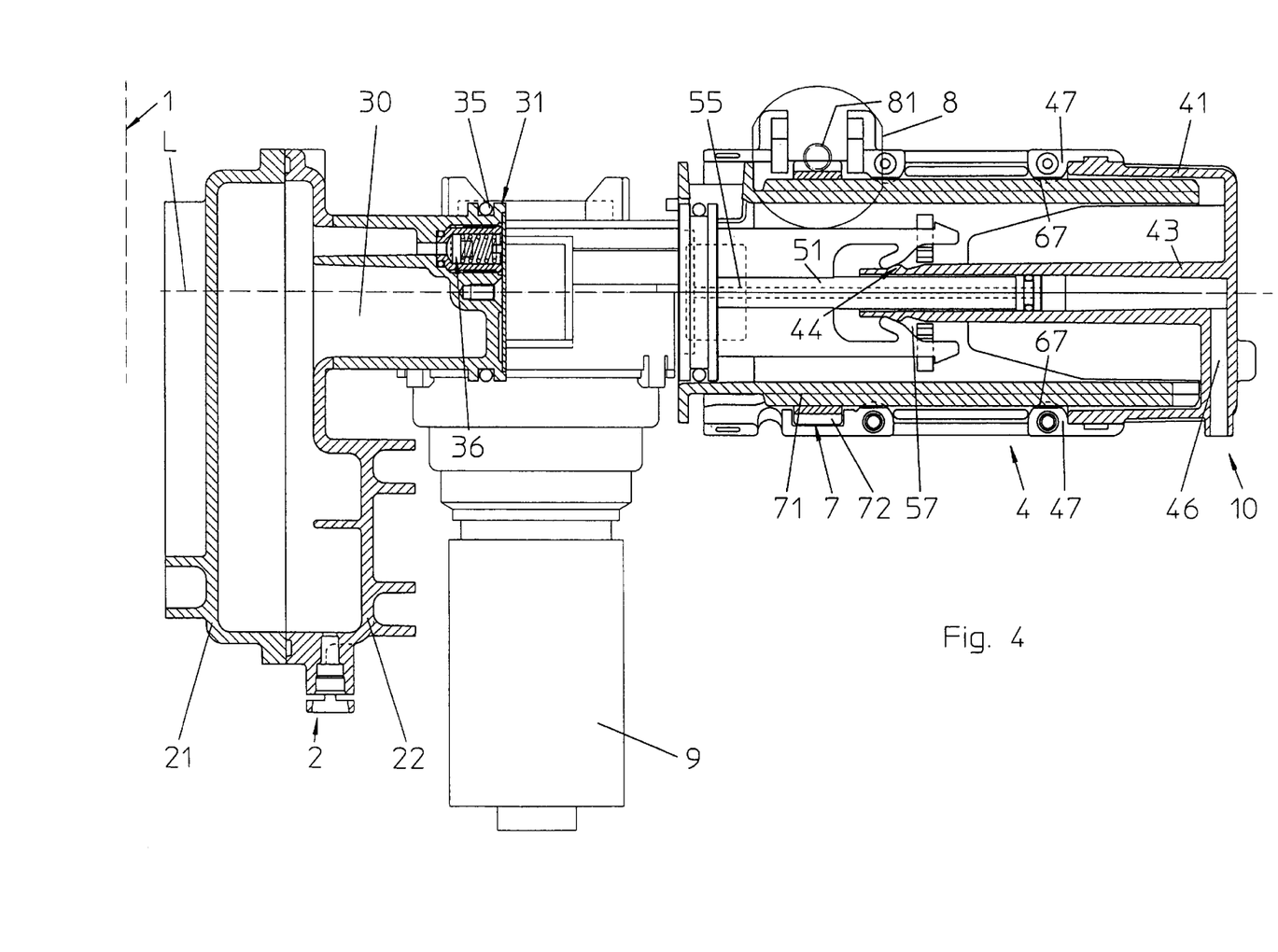
FIG. 4 shows the boiler and a brewing module according to FIG. 1 in the discharge position.

After the coffee beverage has been brewed, the brewing cylinder is moved in the opposite direction; this is accomplished by reversing the sense of rotation of the driving motor 8. Thereby, the brewing piston is entrained by the brewing cylinder, since the friction between the sealing ring 52 of the brewing piston 5 and the brewing chamber 6 is sufficient to entrain the brewing piston. At a certain point of the backward motion of the brewing cylinder 6, the brewing piston 5 is further entrained in a positive manner by means of catch elements that are not shown in the drawing until the snap cams 57 of the brewing piston 5 snap into the shoulder of the tube-like collar 43. The result is that the brewing piston 5 now is fixed in its base position. Additionally to the snap means 44, 57, a back stop member can be provided in order to ensure that the brewing piston safely rests in its rear base position. The brewing cylinder, however, is further moved such that a relative movement between brewing cylinder 6 and brewing piston 5 results; in this way, the used coffee powder cake is pushed out of the brewing cylinder 6, until finally the brewing piston 5 is flush with the front side of the brewing cylinder 6. The used coffee powder cake falls downwards by its own weight in a collecting container that is not shown in the drawings. In order to support the reliable removal of the used coffee powder cake, additionally, a not shown scraper can be provided. Now, the brewing module 4 is in its initial position again in which it can be removed from the housing of the coffee machine. The brewing module 4, once removed from the housing 1, can be washed in a very simple manner, for example by flushing it with fresh water.

The cleaning of the closure piston that remains in the coffee machine can be performed from the outside, for example, by means of a brush. Another possibility is to provide a rinsing program in which the closure piston is flushed with hot water, either with removed brewing module, or with the brewing module inserted into the coffee machine, but the brewing cylinder not being filled with coffee powder. Since the closure piston normally in not in contact with the brewed coffee beverage, the latter cleaning method is usually sufficient.

Due to the fact that the closure piston 3 is integrally formed with the water heater 2, on the one hand, the hitherto required connection pipe between water heater 2 and closure piston 3 is no longer necessary. On the other hand, an advantage is that the closure piston 3 is heated by the water heater 2. Both measures contribute to the fact that the temperature of the brewing water, upon entering the brewing chamber, always has a constant predetermined temperature with the result that the coffee powder is penetrated by the brewing water always with the optimal temperature.

By using the brewing module as explained herein before and by virtue of the closure piston that is stationary mounted in the coffee machine, moreover, the coffee machine can be very compactly designed. Furthermore, the brewing module is constructed of a relatively small number of parts; this allows a manufacturing at low costs and ensures a high reliability. Due to the fact that the brewing cylinder 6 and the brewing piston 5 are longitudinally movable, but do not have to perform any rotating or swiveling motion, a swiveling drive for moving the brewing cylinder from a filling position to a brewing position can be avoided; again, this is an advantage as far as costs, number of parts and reliability are concerned.

What is claimed is:

1. A coffee machine, comprising:
  a means for heating water having a housing;
  an essentially hollow brewing cylinder means having a central longitudinal axis and an open end;
  means for moving said brewing cylinder means along said central longitudinal axis;
  a closure piston means adapted to close said open end of said brewing cylinder means to thereby form a brewing chamber; and
  a brewing piston means located in the interior of said brewing cylinder means, said brewing piston means being movable along said central longitudinal axis to compress coffee powder received in said brewing cylinder means as well as for removing the used coffee powder cake;
  said closure piston means being an integral part of said means for heating water,
  said closure piston means being located inside said brewing cylinder during brewing of said coffee,
  said closure piston means is designed as a projection of the housing of said means for heating water.

2. A coffee machine, comprising:
  a means for heating water having a housing;
  an essentially hollow brewing cylinder means having a central longitudinal axis and an open end;
  means for moving said brewing cylinder means along said central longitudinal axis;
  a closure piston means adapted to close said open end of said brewing cylinder means to thereby form a brewing chamber; and
  a brewing piston means located in the interior of said brewing cylinder means, said brewing piston means being movable along said central longitudinal axis to compress coffee powder received in said brewing cylinder means as well as for removing the used coffee powder cake;
  said closure piston means being an integral part of said means for heating water,
  said closure piston means being located inside said brewing cylinder during brewing of said coffee,
  said housing of said water heater essentially consists of two half shells, whereby one of said two half shells is provided with said closure piston member.

3. A coffee machine according to claim 2 in which said half shells consist of metallic material, preferably aluminum.

4. A coffee machine, comprising:
  a means for heating water having a housing;
  an essentially hollow brewing cylinder means having a central longitudinal axis and an open end;
  means for moving said brewing cylinder means along said central longitudinal axis;
  a closure piston means adapted to close said open end of said brewing cylinder means to thereby form a brewing chamber; and
  a brewing piston means located in the interior of said brewing cylinder means, said brewing piston means being movable along said central longitudinal axis to compress coffee powder received in said brewing cylinder means as well as for removing the used coffee powder cake;
  said closure piston means being an integral part of said means for heating water,
  said closure piston means being located inside said brewing cylinder during brewing of said coffee,
  said means for moving said brewing cylinder means is a spindle drive.

5. A coffee machine, comprising:
  a means for heating water having a housing;
  an essentially hollow brewing cylinder means having a central longitudinal axis and an open end;
  means for moving said brewing cylinder means along said central longitudinal axis;
  a closure piston means adapted to close said open end of said brewing cylinder means to thereby form a brewing chamber; and
  a brewing piston means located in the interior of said brewing cylinder means, said brewing piston means being movable along said central longitudinal axis to compress coffee powder received in said brewing cylinder means as well as for removing the used coffee powder cake;
  said closure piston means being an integral part of said means for heating water,
  said closure piston means being located inside said brewing cylinder during brewing of said coffee,
  said means for moving said brewing cylinder means is a spindle drive,
  said brewing cylinder means is provided with an outer thread, whereby the brewing module is provided with a rotating actuation member that is located concentrically to the brewing cylinder means that is provided with a thread at its inner side which engages the outer thread of the brewing cylinder means, and whereby said actuation member is designed as a toothed wheel at its periphery and the teeth of the toothed wheel are adapted to engage with a drive means of a drive motor adapted for moving the brewing cylinder means.

6. A coffee machine according to claim 5 in which said drive motor is located beside the brewing module.

* * * * *